United States Patent
Dino et al.

(10) Patent No.: US 8,389,447 B2
(45) Date of Patent: Mar. 5, 2013

(54) ORGANOPHILIC CLAY ADDITIVES AND OIL WELL DRILLING FLUIDS WITH LESS TEMPERATURE DEPENDENT RHEOLOGICAL PROPERTIES

(75) Inventors: David Dino, Cranbury, NJ (US); Jeffrey Thompson, Hightstown, NJ (US)

(73) Assignee: Elementis Specialties, Inc., East Windsor, NJ (US)

( * ) Notice: Subject to any disclaimer, the term of this patent is extended or adjusted under 35 U.S.C. 154(b) by 336 days.

(21) Appl. No.: 12/793,895

(22) Filed: Jun. 4, 2010

(65) Prior Publication Data

US 2010/0305008 A1 Dec. 2, 2010

Related U.S. Application Data

(63) Continuation-in-part of application No. 11/359,786, filed on Feb. 22, 2006, now abandoned.

(51) Int. Cl.
*C09K 8/60* (2006.01)
(52) U.S. Cl. ........ 507/240; 507/100; 507/129; 507/140; 516/101; 501/146; 166/305.1
(58) Field of Classification Search .................. 507/100, 507/129, 140, 240; 516/101; 501/146; 166/305.1
See application file for complete search history.

(56) References Cited

U.S. PATENT DOCUMENTS

| | | | |
|---|---|---|---|
| 2,355,356 A | 5/1941 | Young, Jr. | |
| 2,966,506 A | 12/1960 | Jordan | |
| 4,081,496 A | 3/1978 | Finlayson | |
| 4,105,578 A | 8/1978 | Finlayson et al. | |
| 4,116,866 A | 9/1978 | Finlayson | |
| 4,208,218 A | 6/1980 | Finlayson | |
| 4,391,637 A | 7/1983 | Mardis et al. | |
| 4,410,364 A | 10/1983 | Finlayson et al. | |
| 4,412,018 A | 10/1983 | Finlayson et al. | |
| 4,434,075 A | 2/1984 | Mardis et al. | |
| 4,434,076 A | 2/1984 | Mardis et al. | |
| 4,450,095 A | 5/1984 | Finlayson | |
| 4,508,628 A | 4/1985 | Walker et al. | |
| 4,517,112 A | 5/1985 | Mardis et al. | |
| 5,389,200 A | 2/1995 | Cody et al. | |
| 5,725,805 A | 3/1998 | Kemnetz | |
| 5,837,654 A | 11/1998 | Carroll et al. | |
| 6,458,343 B1 | 10/2002 | Zeman et al. | |
| 6,462,096 B1* | 10/2002 | Dino et al. | 516/101 |
| 7,939,470 B1 | 5/2011 | Wagle et al. | |
| 2004/0110642 A1 | 6/2004 | Thompson et al. | |
| 2007/0197403 A1* | 8/2007 | Dino et al. | 507/240 |
| 2008/0194433 A1* | 8/2008 | Tehrani | 507/219 |

FOREIGN PATENT DOCUMENTS

| | | |
|---|---|---|
| EP | 0133071 | 2/1985 |
| EP | 0542266 A2 | 5/1993 |
| EP | 1138740 A1 | 4/2001 |
| FR | 2547826 A1 | 12/1984 |
| WO | 9850484 A1 | 11/1998 |
| WO | 2007100586 | 9/2007 |

OTHER PUBLICATIONS

International Search Report for PCT/US2011/35218 dated Jul. 13, 2011, 3 pages.
Written Opinion for PCT/US2011/35218 dated Jul. 13, 2011, 6 pages.
International Preliminary Report on Patentability for PCT/US2007/04528 dated Oct. 16, 2008, 6 pages.
International Search Report for PCT/US2007/04528 dated Sep. 27, 2007, 3 pages.
Attapulgite Clay structure: http://www/attapulgite.org/ Jan. 2003.
Lokanatha et al., Dehydration and phase transformation in attapulgite (palygorskite)—an R.D.F. study, J. Mat. Sci. Lett., vol. 3, 1984, pp. 1105-1108, XP002570065.
Supplemental European Search Report for EP 07751298 dated Feb. 24, 2010.

* cited by examiner

*Primary Examiner* — Alicia Toscano
(74) *Attorney, Agent, or Firm* — Morgan, Lewis & Bockius LLP

(57) ABSTRACT

An additive composition including a synergistic combination of a hectorite organoclay composition and an attapulgite organoclay composition. The hectorite organoclay composition includes (i) a first organic cation provided by an alkoxylated quaternary ammonium salt; and ii) a second organic cation wherein such second organic cation is not provided by an alkoxylated quaternary ammonium salt. The attapulgite organoclay composition includes (iii) a third organic cation provided by an alkoxylated quaternary ammonium salt; and (iv) a fourth organic cation wherein such third organic cation is not provided by an alkoxylated quaternary ammonium salt.

6 Claims, No Drawings

ORGANOPHILIC CLAY ADDITIVES AND OIL WELL DRILLING FLUIDS WITH LESS TEMPERATURE DEPENDENT RHEOLOGICAL PROPERTIES

RELATED APPLICATIONS

This application is a continuation in part of U.S. patent application Ser. No. 11/359,786, filed Feb. 22, 2006, entitled "Organophilic Clay Additives and Oil Well Drilling Fluids with Less Temperature Dependent Rheological Properties" which is incorporated herein by reference in its entirety.

FIELD OF THE INVENTION

The present invention relates to improved oil based well bore fluids known in the oil service industry as drilling fluids, and, in particular, to oil based invert emulsion types of drilling fluids in which water is dispersed in an oil-based medium, which fluids contain defined organoclays.

BACKGROUND OF THE INVENTION

Oil Well Drilling Fluids

The American oil producing industry has used drilling fluids since the very beginning of oil well drilling operations in the United States. Drilling fluids and their chemistry have been an important area for scientific investigation and contain innovation from the beginning up to the present day.

Such drilling fluids in modern practice are pumped under great pressure through a long "string" of pipe previously placed into the ground after drilling, then (at the very bottom of the drill hole) through the center of the drilling bit, being then returned up through the small space between the outside of the drill pipes and the borehole wall itself. Drilling base fluids, the liquid carriers of the system, are often comprised of oils (diesel, mineral and poly(alpha-olefin)), propylene glycol, methyl glucoside, modified esters and ethers, water, and emulsions of oil and water of varying proportions.

A drilling fluid is a thixotropic system; that is, it exhibits low viscosity when sheared, such as on agitation or circulation (as by pumping) but, when such shearing action is halted, the fluid thickens to hold cuttings in place. The fluid must become thick rapidly, reaching a sufficient gel strength before suspended materials fall any significant distance—and this behavior must be totally reversible at all temperatures encountered. In addition, when a free-flowing liquid, the fluid must retain a sufficiently high viscosity to carry all unwanted particulate matter from the bottom of the hole back up to the surface.

A drilling fluid must accomplish a number of these inter-related functions over a wide range of temperatures to satisfy the requirements to be a commercial drilling fluid. To maintain these functions under the very hot temperatures encountered in modern drilling has proved extremely difficult with the use of commercial rheological drilling fluid additives presently available on the market. These functions can be grouped as follows:

(1) The fluid must constantly lubricate the drill bit so as to promote drilling efficiency and retard bit wear, (2) The fluid must have a proper thickness or viscosity to meet the many different criteria required by the drill owner/operator, (3) The fluid must provide filtration control, (4) The fluid must suspend and transport solid particles such as weighting agents (to increase specific gravity of the mud; generally barytes; a barium sulfate ore, ground to a fine particle size) when drilling is interrupted, and (5) The fluid must control formation pressure.

The above functions must be satisfactorily provided throughout the time the fluid is in the entire length of the drill hole. Since the drill hole can be as much as tens of thousands of feet long, varying extreme hot and cold temperatures are encountered, which temperature changes can particularly affect the fluid's physical properties and performance. Different measures of control during drilling can occur because of high ranges of a) encountered temperature (as high as 500° F.), b) time durations, c) pressures (from only a few bars to those exerted by a column of fluid that can extend for thousands of feet) and d) drilling directions (from vertical to horizontal).

Finally, it is also important to note that a drilling fluid must perform its various functions not only when the drill bit is actively encountering the bottom of the borehole, but also at all times and at all locations in the well bore.

One of the principal problems facing "mud chemistry" scientists is the production of thickening agents, thixotropes and drilling fluids having satisfactory dispersibility, with the necessary subsidiary thixotropic properties discussed above, while at the same time possessing critically important rheological properties over a wide range of temperatures. While the compositions of these various fluids is considered a "black art", in reality, fluids and their additives involve highly complex chemical, and rheological analysis using intricate chemical and mathematical calculations, modeling and rheological analysis.

Temperature Sensitivity

In modern times, hydrocarbon drilling for exploratory and production wells has increasingly been done from platforms located in water settings, often called off-shore drilling. Such fresh and salt water drilling employ barges and rigs fixed in some fashion to the submerged surface of the earth.

Economic and technical advances have recently pushed these drilling operations into harsher environments. Although advances in equipment and engineering have yielded technology capable of drilling in water depths up to 10,000 feet or more, advances required in drilling fluid technology have lagged.

One important area of application for the new drilling fluid systems is in geothermal drilling, particularly when a well is drilled at an angle other than vertical. One object of the invention is particularly to make available industrially usable drilling fluids with enhanced properties over a large and "hot" temperature range. The systems can be put to use in land-based drilling operations as well as offshore operations.

Drilling fluids with enhanced temperature properties have become both more important and complex over the past decade as a result of changes in directional drilling technology. Such wells are also known as deviated wells; the extent of the angle of deviation can be from a few degrees to horizontal.

Use of a downhole motor allows the hole to be deviated by the introduction of a fixed offset or bend just above the drill bit. This offset or bend can be oriented by modern MWD systems which are capable of reporting accurately the current bit and toolface hole angle and azimuth (i.e. the orientation with respect to the upper portion of the hole). It is accordingly possible to rotate the drill string until the toolface has achieved the desired direction of deviation, and then to fix the drill string in place and commence the deviation by starting the motor to extend the hole in the desired deviated direction.

Methods for deviating wells have changed greatly over recent years with the production of more powerful and reliable downhole motors, and the invention of more accurate techniques utilizing wireline techniques as well as the highly computerized downhole, sensing and micro reduction equipment, including improvements in sounding apparatus and microwave transmission.

Organoclays

It has been long known that organoclays can be used to thicken organic compositions and particularly drilling fluids. See J. W. Jordan, "Proceedings of the 10th National Conference on Clays and Clay Minerals" (1963) which discusses a wide range of applications of organoclays from high polarity liquids to low polarity liquids.

The efficiency of some organophilic clays in non-aqueous systems can be further improved by adding a low molecular weight polar organic material to the composition. Such polar organic materials have been called polar activators, dispersants, dispersion aids, solvating agents and the like.

Furthermore, the preparation of preactivated organophilic clay gellants that are used to thicken organic compositions wherein the activators are admixed with the organophilic clay has been described.

More recently, organophilic clay gellants have been developed which are the reaction products of smectite-type clays having a cation exchange capacity with certain organic cations or organic cations and organic anion combinations. These gellants have the advantage of being effectively dispersible in particular organic compositions without the need for a dispersion aid under normal shear conditions.

Oil based drilling fluids particularly those containing conventional organophilic clay rheological additives suffer considerable viscosity loss as the drilling fluid is heated from a temperature of 250° F. to 350° F., for example. Above about 350° F., a drilling fluid using conventional organophilic clays for viscosity build can consume as much as three times the clay content to maintain suitable viscosity for cuttings transport alone. Above 400° F., alternatives to organoclays such as asphalt muds have been considered necessary—such muds however have an even wider variety of problems.

The disadvantages of existing organoclay compositions for non-aqueous systems are that they provide less effective rheology as temperatures increase and often totally fail at temperature around 350 and 400° F.

SUMMARY OF THE INVENTION

The invention herein discloses new oil based drilling fluids using specific organoclays, particularly oil invert drilling muds, which provide improved rheological properties at elevated temperatures, high ecological acceptability over prior art fluids, and at the same time good application properties upon initial make-up.

In an important aspect the invention relates to novel organophilic clay gellants and to improved oil based drilling fluids containing such organoclays; in still another aspect the invention is directed to processes for providing less temperature dependent viscosity and other rheological properties to such fluids over the wide, and often very high, temperature ranges found in more recent drilling operations.

The present invention relates to the discovery of novel organoclays and oil based drilling fluids containing such organoclays, particularly oil based invert emulsion drilling fluids, that provide more stable drilling fluid viscosity in temperatures in excess of 350° F. when compared to conventional fluids containing the specific organoclays as the rheological additive. The present invention also involves a process for providing rheology and anti-settling properties to oil based drilling fluids by adding to such fluid systems specific organoclays as rheological additives. The invention also includes novel drilling fluids containing such rheological additives.

An organophilic clay additive for oil based drilling fluids providing such fluid with improved temperature stable rheological properties is disclosed. In one embodiment, the organophilic additive comprises the reaction product of an attapulgite clay having a cation exchange capacity of at least 5 milliequivalents per 100 grams of clay, 100% active clay basis; and a first organic cation provided by an alkoxylated quaternary ammonium salt; and a second organic cation wherein such second organic cation is not provided by an alkoxylated quaternary ammonium salt. The total amount of the first and second organic cations is provided in an amount from about +25% to −25% of the cation exchange capacity of the attapulgite clay, preferably from +/−10% of the cation exchange capacity, and most preferably in an amount equal to the cation exchange capacity of the attapulgite clay. The alkoxylated quaternary ammonium salt is preferably present in an amount of greater than about 50% by weight of the total amount of organic cation content. Most preferably, the alkoxylated quaternary ammonium salt is present in an amount from about 50% to 100% by weight of the total amount of organic cation content.

In another embodiment, the additive composition includes a synergistic combination of a hectorite organoclay composition and an attapulgite organoclay composition. The hectorite organoclay composition includes (i) a first organic cation provided by an alkoxylated quaternary ammonium salt; and ii) a second organic cation wherein such second organic cation is not provided by an alkoxylated quaternary ammonium salt. The attapulgite organoclay composition includes (iii) a third organic cation provided by an alkoxylated quaternary ammonium salt; and (iv) a fourth organic cation wherein such third organic cation is not provided by an alkoxylated quaternary ammonium salt.

In another embodiment, the additive includes a mixture of a hectorite organoclay composition and an attapulgite organoclay composition. The hectorite organoclay composition is present in an amount ranging from 10% by weight to 75% by weight of the total mixture and the attapulgite organoclay composition is present in an amount ranging from 25% by weight to 90% by weight of the total mixture. The hectorite organoclay composition includes (i) a hectorite clay having a cation exchange capacity of at least 75 milliequivalents per 100 grams of clay, 100% active clay basis; (ii) a first organic cation provided by an alkoxylated quaternary ammonium salt; and iii) a second organic cation wherein such second organic cation is not provided by an alkoxylated quaternary ammonium salt. The second organic cation is present in an amount of from 5% to about 95% by weight of the total hectorite organic cation content, and the total amount of hectorite organic cations ii) and iii) is about equal to the cation exchange capacity of the hectorite clay. The attapulgite organoclay composition includes (i) an attapulgite clay having a cation exchange capacity of at least 5 milliequivalents per 100 grams of clay, 100% active clay basis; (ii) a third organic cation provided by an alkoxylated quaternary ammonium salt; and (iii) a fourth organic cation wherein such third organic cation is not provided by an alkoxylated quaternary ammonium salt. The third organic cation is present in an amount of at least 15% by weight of the total amount of attapulgite organic cation content, and wherein the total amount of attapulgite organic cations (ii) and (iii) is provided in an amount from about +25% to −25% of the cation exchange capacity of the attapulgite clay.

In one embodiment, the first and third organic cations may be provided by a compound selected from the group having the following formula:

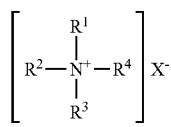

wherein N is nitrogen; X⁻ comprises an anion selected from the group consisting of chloride, methyl sulfate, acetate, iodide, and bromide, preferably chloride; $R^1$=a $C_{12}$ to $C_{30}$, preferably $C_{12}$ to $C_{22}$, and more preferably $C_{16}$ to $C_{18}$ linear or branched, saturated or unsaturated alkyl group, or alkyl-ester groups having 8 to 30 carbon atoms, and most preferably $R^1$=a $C_{16}$ to $C_{18}$ linear saturated alkyl group; $R^2$=H— or a $C_1$ to $C_{30}$ linear or branched, saturated or unsaturated alkyl group: $R^3$=H—, $C_1$ to $C_4$ linear or branched, saturated or unsaturated alkyl group or $R^4$, and; $R^4$=—(CR$^9$R$^{10}$—CR$^{11}$R$^{12}$O)$_y$H, where $R^9$, $R^{10}$, $R^{11}$, and $R^{12}$ are independently selected from the group consisting of H—, CH$_3$—, and CH$_3$CH$_2$— and y is 4 to 12 on average.

In another embodiment, $R^1$=$C_{16}$ to $C_{18}$ linear saturated alkyl group; $R^2$=a methyl group; $R^3$ and $R^4$ are (CR$^9$R$^{10}$—CR$^{11}$R$^{12}$O)$_y$H where $R^9$, $R^{10}$, $R^{11}$, and $R^{12}$ are independently selected from the group consisting of H—, CH$_3$—, and CH$_3$CH$_2$— and y is 4 to 12 on average. In one such embodiment, $R^9$, $R^{10}$, $R^{11}$, and $R^{12}$ are H and y is on average about 7.5.

The second and fourth organic cations are preferably selected from the group consisting of dimethyl bis[fatty alkyl]ammonium, benzyl methyl bis[fatty alkyl]ammonium, methyl tris[fatty alkyl]ammonium quaternary salts and mixtures thereof.

The hectorite clay may be beneficiated hectorite clay or may be a component of a mixture of clays including smectite clay.

The attapulgite clay may be beneficiated attapulgite clay or may be a component of a mixture of clays including smectite clay.

In another embodiment an oil based drilling fluid with less temperature dependant rheological properties is disclosed. In one such embodiment, the drilling fluid comprises an oil based drilling fluid composition, and an organophilic clay gellant comprising the reaction product of:

an attapulgite clay having a cation exchange capacity of at least 5 millequivilants per 100 grams of clay 100% active clay basis;

a first organic cation provided by an alkoxylated quaternary ammonium salt; and a second organic cation wherein such second organic cation is not provided by an alkoxylated quaternary ammonium salt;

wherein the total amount of the first organic cation and the second organic cation is provided in an amount from about +25% to −25% of the cation exchange capacity of the attapulgite clay. The organophilic clay gellant can optionally be combined with other standard or prior art organoclays, present in an amount of about 0.01% to about 15% based on the total weight of the fluid system. Preferably, the organophilic clay gallant is present from 0.3% to 5% based on the total weight of the fluid.

The organoclay is the reaction product of attapulgite clay selected from the group consisting of crude attapulgite, natural attapulgite, beneficiated attapulgite, synthetic attapulgite, spray dried attapulgite and mixtures thereof. The attapulgite clay may also comprise smectite clays.

In another embodiment, an oil based drilling fluid with less temperature dependant rheological properties includes an oil based drilling fluid base composition and a mixture of an hectorite organoclay composition and an attapulgite organoclay composition, where the hectorite organoclay composition is present in an amount ranging from 10% by weight to 75% by weight of the total mixture and the attapulgite organoclay composition is present in an amount ranging from 25% by weight to 90% by weight.

In one such embodiment, the hectorite organoclay composition includes (i) a hectorite clay having a cation exchange capacity of at least 75 milliequivalents per 100 grams of clay, 100% active clay basis; (ii) a first organic cation provided by an alkoxylated quaternary ammonium salt; and iii) a second organic cation wherein such second organic cation is not provided by an alkoxylated quaternary ammonium salt. The second organic cation is present in an amount of from 5% to about 95% by weight of the total hectorite organic cation content, and the total amount of hectorite organic cations ii) and iii) is about equal to the cation exchange capacity of the hectorite clay. The attapulgite organoclay composition includes (i) an attapulgite clay having a cation exchange capacity of at least 5 milliequivalents per 100 grams of clay, 100% active clay basis; (ii) a third organic cation provided by an alkoxylated quaternary ammonium salt; and (iii) a fourth organic cation wherein such third organic cation is not provided by an alkoxylated quaternary ammonium salt. The third organic cation is present in an amount of at least 15% by weight of the total amount of attapulgite organic cation content, and wherein the total amount of attapulgite organic cations (ii) and (iii) is provided in an amount from about +25% to −25% of the cation exchange capacity of the attapulgite clay.

The viscosity of the fluid measured by API standard rheological procedures results in an apparent viscosity, plastic viscosity and/or yield point that is less affected by temperature in excess of 350° F. than drilling fluids containing organoclays made using quaternary ammonium compounds not containing alkoxylated salts.

In another embodiment, a process for providing less temperature dependent rheological properties to an oil based drilling fluid is provided. The process includes preparing an oil based drilling fluid base composition and incorporating into such drilling fluid base composition one or more of the organophilic clay additives and organoclay mixtures described herein.

DETAILED DESCRIPTION

The fluids of this invention can be used as oil based drilling fluids and more particularly for oil based invert emulsion drilling fluids employed in high temperature drilling applications. The fluids of the invention can also find utility in a wide range of other oil based drilling fluids. The term oil based drilling fluid is defined as a drilling fluid in which the continuous phase is hydrocarbon based. Oil based fluids formulated with over about 5% water are classified as oil based invert emulsion drilling fluids. Commonly, oil based invert emulsion drilling fluids will contain water as the discontinuous phase in any proportion up to about 50%.

Unlike the specific organoclays useful in the invention hereof, oil based invert muds thickened with conventional organophilic clays undergo marked viscosity changes in the mud when these muds are heated much above 350° F., whereas muds prepared according to the present invention are dramatically more viscosity-stable over the same temperature ranges. As a result, the fluids of this invention are ideal for increased temperature applications, such as geothermal drilling and directional drilling, for example.

The preferred well bore fluids of the invention are oil based drilling fluids, most preferably oil based invert emulsions. The term oil based drilling fluids are defined as a hydrocarbon based drilling fluids. Oil based invert emulsions have an oil "continuous" phase and an aqueous internal phase. The term "emulsion" is commonly used to describe systems in which water is the external or continuous phase and oil is dispersed within the external phase. The term "invert" means that the hydrocarbon-oil substance is the continuous or external phase and that an aqueous fluid is the internal phase.

Water in the form of brine is often used in forming the internal phase of these type fluids. Brine can be defined as an aqueous solution which can contain from about 10 to 350,000 parts per million of metal ions such as lithium, sodium, potassium, magnesium, or calcium ions. The preferred brines used to form the internal phase of the preferred fluid of the invention contain from about 5 to about 35% by weight calcium chloride and may contain various amounts of other dissolved salts such as sodium bicarbonate, sodium sulfate, sodium acetate, sodium borate, potassium chloride, or sodium chloride.

The ratio of water (brine) to oil in the emulsions of the invention should generally provide as high a brine content as possible while still maintaining a stable emulsion since a high water content drilling fluid is less expensive and less objectionable to work with than a drilling fluid containing a low water content. Oil/brine ratios in the range from about 95:5 to 50:50 have been found to work satisfactorily, depending upon the particular oil chosen. Thus the water content of a typical drilling fluid prepared according to the teachings of the invention will have an aqueous (water) content of about 0 to 50 volume percent, with the most preferred range being about 5 to 30 volume percent, most preferably about 10 to 20 volume percent of the drilling fluid.

In order to form a stable emulsion, a surfactant or emulsifier can also be added to the external, the internal or both phases. The emulsifier is preferably selected from a number of organic acids which are familiar to those skilled in the drilling fluid area, including the monocarboxyl alkanoic, alkenoic, or alkynoic fatty acids containing from about 3 to 20 carbon atoms, and mixtures thereof. Examples of this group of acids include stearic, oleic, caproic, capric and butyric acids. Adipic acid, a member of the aliphatic dicarboxylic acids can also be used. More preferred surfactants or emulsifiers include lime, fatty acid calcium salts and lecithin.

Weighting materials are also used to weight the well bore fluids of the invention to a density in the preferred range from about 8 pounds per gallon to 18 pounds per gallon and greater. Weighting materials well known in the art include barite, ilmenite, calcium carbonate, iron oxide and lead sulfide. The preferred weighting material is commercially available barite.

In one embodiment, an organophilic clay comprises the reaction product of
 a) attapulgite clay having a cation exchange capacity of at least 5 milliequivalents per 100 grams of clay, 100% active clay basis; and
 b) a first organic cation provided by an alkoxylated quaternary ammonium salt; and
 c) a second organic cation wherein such second organic cation is not an alkoxylated quaternary ammonium salt.

In one embodiment, the additive composition includes a synergistic combination of a hectorite organoclay composition and an attapulgite organoclay composition. This composition imparts unexpected rheological and suspension properties to an oil based drilling fluid than each compound used alone.

In another embodiment, an additive includes a mixture of a hectorite organoclay composition and an attapulgite organoclay composition. In one such embodiment, the hectorite organoclay composition is present in an amount ranging from 10% by weight to 75% by weight of the total mixture and the attapulgite organoclay composition is present in an amount ranging from 25% by weight to 90% by weight. In another embodiment, the hectorite organoclay composition is present in an amount ranging from 10% by weight to 50% by weight of the total mixture and the attapulgite organoclay composition is present in an amount ranging from 50% by weight to 90% by weight. In another such embodiment, the hectorite organoclay composition is present in an amount ranging from 10% by weight to 35% by weight of the total mixture and the attapulgite organoclay composition is present in an amount ranging from 65% by weight to 90% by weight. In yet another such embodiment, the hectorite organoclay composition is present in an amount ranging from 10% by weight to 25% by weight of the total mixture and the attapulgite organoclay composition is present in an amount ranging from 75% by weight to 90% by weight.

In yet another embodiment, a drilling fluid system includes an oil based drilling fluid base composition and a synergistic mixture of a hectorite organoclay composition and an attapulgite organoclay composition.

In yet another embodiment, a drilling fluid system includes an oil based drilling fluid base composition and a mixture of a hectorite organoclay composition and an attapulgite organoclay composition. In one such embodiment, the hectorite organoclay composition is present in an amount ranging from 10% by weight to 75% by weight of the total mixture and the attapulgite organoclay composition is present in an amount ranging from 25% by weight to 90% by weight. In another embodiment, the hectorite organoclay composition is present in an amount ranging from 10% by weight to 50% by weight of the total mixture and the attapulgite organoclay composition is present in an amount ranging from 50% by weight to 90% by weight. In another such embodiment, the hectorite organoclay composition is present in an amount ranging from 10% by weight to 35% by weight of the total mixture and the attapulgite organoclay composition is present in an amount ranging from 65% by weight to 90% by weight. In yet another such embodiment, the hectorite organoclay composition is present in an amount ranging from 10% by weight to 25% by weight of the total mixture and the attapulgite organoclay composition is present in an amount ranging from 75% by weight to 90% by weight.

In yet another embodiment, method for providing an oil based drilling fluid includes the steps of: preparing an oil based drilling fluid composition; and incorporating into such oil based drilling fluid composition a synergistic mixture of a hectorite organoclay composition and an attapulgite organoclay composition.

In still yet another embodiment, method for providing an oil based drilling fluid includes the steps of: preparing an oil based drilling fluid composition; and incorporating into such oil based drilling fluid composition a mixture of a hectorite organoclay composition and an attapulgite organoclay composition. In one such embodiment, the hectorite organoclay composition is present in an amount ranging from 10% by weight to 75% by weight of the total mixture and the attapulgite organoclay composition is present in an amount ranging from 25% by weight to 90% by weight. In another embodiment, the hectorite organoclay composition is present in an amount ranging from 10% by weight to 50% by weight of the total mixture and the attapulgite organoclay composition is present in an amount ranging from 50% by weight to 90% by weight. In another such embodiment, the hectorite organoclay composition is present in an amount ranging from 10% by weight to 35% by weight of the total mixture and the attapulgite organoclay composition is present in an amount ranging from 65% by weight to 90% by weight. In yet another such embodiment, the hectorite organoclay composition is present in an amount ranging from 10% by weight to 25% by weight of the total mixture and the attapulgite organoclay composition is present in an amount ranging from 75% by weight to 90% by weight.

Organoclays

The various embodiments of hectorite organoclay and attapulgite organoclay that may be used in additive compositions, the drilling fluid compositions, and method for providing an oil based drilling fluid, as described herein, are discussed below.

In such embodiments, the hectorite organoclay composition includes (i) a hectorite clay having a cation exchange capacity of at least 75 milliequivalents per 100 grams of clay, 100% active clay basis; (ii) a first organic cation provided by an alkoxylated quaternary ammonium salt; and iii) a second organic cation wherein such second organic cation is not provided by an alkoxylated quaternary ammonium salt. The second organic cation is present in an amount of from 5% to about 95% by weight of the total hectorite organic cation content, and the total amount of hectorite organic cations ii) and iii) is about equal to the cation exchange capacity of the hectorite clay. The attapulgite organoclay composition includes (i) an attapulgite clay having a cation exchange capacity of at least 5 milliequivalents per 100 grams of clay, 100% active clay basis; (ii) a third organic cation provided by an alkoxylated quaternary ammonium salt; and (iii) a fourth organic cation wherein such third organic cation is not provided by an alkoxylated quaternary ammonium salt. The third organic cation is present in an amount of at least 15% by weight of the total amount of attapulgite organic cation content, and wherein the total amount of attapulgite organic cations (ii) and (iii) is provided in an amount from about +25% to −25% of the cation exchange capacity of the attapulgite clay.

In another such embodiments, the hectorite organoclay composition includes (i) a hectorite clay having a cation exchange capacity of at least 75 milliequivalents per 100 grams of clay, 100% active clay basis; (ii) a first organic cation provided by an alkoxylated quaternary ammonium salt; and iii) a second organic cation wherein such second organic cation is not provided by an alkoxylated quaternary ammonium salt. The second organic cation is present in an amount of from 25% to about 75% by weight of the total hectorite organic cation content, and the total amount of hectorite organic cations ii) and iii) is about equal to the cation exchange capacity of the hectorite clay. The attapulgite organoclay composition includes (i) an attapulgite clay having a cation exchange capacity of at least 5 milliequivalents per 100 grams of clay, 100% active clay basis; (ii) a third organic cation provided by an alkoxylated quaternary ammonium salt; and (iii) a fourth organic cation wherein such third organic cation is not provided by an alkoxylated quaternary ammonium salt. The third organic cation is present in an amount of at least 50% by weight of the total amount of attapulgite organic cation content, and wherein the total amount of attapulgite organic cations (ii) and (iii) is provided in an amount from about +25% to −25% of the cation exchange capacity of the attapulgite clay.

The invention uses the above organoclay in an inventive drilling fluid composition thickened with the above-indicated organophilic clay gellants.

In yet another embodiment, a drilling fluid system includes:

a) an oil-based drilling fluid composition; and b) an organophilic clay gellant comprising the reaction product of:

i) attapulgite clay having a cation exchange capacity of at least 5 milliequivalents per 100 grams of clay, 100% active clay basis; and ii) a first organic cation provided by an alkoxylated quaternary ammonium salt; and iii) a second organic cation wherein such second organic cation is not an alkoxylated quaternary ammonium salt Preferred oil based drilling fluid compositions are oil based invert emulsion fluids.

The attapulgite organoclays useful in this invention are the reaction products of attapulgite clays and defined quaternary compounds. Attapulgite clay is well-known in the art and is commercially available from several sources including Engelhard.

The attapulgite clays which may be used in the present invention to prepare the organoclay component of the inventive drilling fluid are attapulgite clays having a cationic exchange capacity of at least 5 milliequivalents per 100 grams of clay, 100% active clay basis, as determined by the well-known standard analytical techniques, such as for example ammonium acetate or methylene blue.

A representative formula for attapulgite clays useful in accordance with the present invention is the following:

Attapulgite

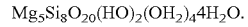

$Mg_5Si_8O_{20}(HO)_2(OH_2)_4 4H_2O$.

The preferred attapulgite clay used in the present invention to make the attapulgite organoclay used in this invention is beneficiated attapulgite, although synthetic and other forms of attapulgite can also be used. A description of attapulgite can be found in Clay Mineralogy by Ralph E. Grim, $2^{nd}$ Edition (published by McGraw Hill).

The hectorite organoclays useful in this invention are the reaction products of hectorite clays and defined quaternary compounds. In one embodiment, the hectorite clay has a cation exchange capacity of at least 75 milliequivalents per 100 grams of clay, 100% active clay basis, as determined by the well-known standard analytical techniques, such as for example ammonium acetate or methylene blue.

A representative formula for hectorite clays useful in accordance with the present invention is the following: $[Mg_{6-x}Li_xSi_8(OH)_{4-f}F_f]_xR$ wherein $0.57 \leq x \leq 1.15$, $f \leq 4$ and R is selected from the group consisting of Na, $L_1$, $NH_4$, and mixtures thereof.

Hectorite clay used in the present invention to make the hectorite organoclay is beneficiated hectorite, although synthetic and other forms of hectorite can also be used.

It will be understood that both sheared and non-sheared forms of the above-listed clays may be employed. In addition, the attapulgite clay or hectorite clay employed can be either crude (containing gangue or non-clay material) or beneficiated (gangue removed). The ability to use crude clay as the clay for this invention represents a substantial cost savings to the overall process. The reason for that is that a clay beneficiation process, which would add cost if required, does not have to be carried out in the present invention.

The instant invention is based on the unexpected discovery that a mixture of organoclays made with specific organic cations provides improved viscosity stability at elevated temperatures to oil-based drilling systems, as well as easier dispersibility upon make-up. The mixture of attapulgite based organoclays and hectorite based organoclays described herein provide certain rheological advantages to oil-based systems not achievable with prior art organoclays. For one example, the attapulgite and hectorite organoclay mixture of the present invention provide more suspension properties over similarly prepared montmorillonite organoclays, without adding as much bulk viscosity as montmorillonite organoclays. Unexpectedly, it was found that the attapulgite and hectorite organoclay mixture of the present invention provide more suspension properties over attapulgite organoclay or hectorite organoclay alone. Those skilled in the art will appreciate the need under certain circumstances where more suspension is desirable but increased bulk viscosity is not.

The cationic organic salts which are important to this invention may be selected from a variety of materials that are capable of forming an organoclay by exchange of cations with the attapulgite clay and the hectorite clay. The organic cations which are reacted with the attapulgite clay or the hectorite must have a positive charge localized on a single atom or on a small group of atoms within the compound. The cation may be provided by compounds selected from the group consisting of quaternary ammonium salts, phosphonium salts, sulfonium salts and mixtures thereof.

The first and third organic cation provided by an alkoxylated quaternary ammonium salt or mixtures thereof. This salt can preferably be provided by a compound selected from the group having the following formula:

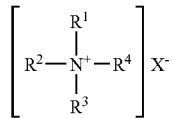

wherein
1. N is nitrogen;
2. $R^1$=a $C_{12}$ to $C_{30}$, preferably $C_{12}$ to $C_{22}$, and more preferably $C_{16}$ to $C_{18}$ linear or branched, saturated or unsaturated alkyl group, or alkyl-ester groups having 8 to 30 carbon atoms. Most preferably $R^1$=a $C_{16}$ to $C_{18}$ linear saturated alkyl group;
3. $R^2$=H— or a $C_1$ to $C_{30}$ linear or branched, saturated or unsaturated alkyl group, more preferably either H—, a $C_1$ or $C_{16}$ to $C_{18}$ linear saturated alkyl group, and most preferably a methyl group:
4. $R^3$=H— or a $C_1$ to $C_4$ linear or branched, saturated or unsaturated alkyl group or $R^4$, most preferably $R^4$ and;
5. $R^4$=—$(CR^9R^{10}$—$CR^{11}R^{12}O)_y$H where:
a. $R^9$, $R^{10}$, $R^{11}$, and $R^{12}$ are independently selected from the group consisting of H—, $CH_3$—, and $CH_3CH_2$—. Preferably $R^9$, $R^{10}$, $R^{11}$, and $R^{12}$ are H— or $CH_3$—, and most preferably are H—.
6. y is on average 4 to 40, preferably 4 to 20, most preferably 4 to 12.

In one such embodiment of formula for the first and third organic cation, $R^1$ is a $C_{16}$ to $C_{18}$ linear saturated alkyl group, $R^2$ is a methyl group, $R^3$ is $R^4$ and wherein $R^9$, $R^{10}$, $R^{11}$, and $R^{12}$=H and y averages about 7.5. $X^-$ comprises an anion selected from the group consisting of chloride, methyl sulfate, acetate, iodide, and bromide, preferably chloride.

The raw materials used to make these quaternary ammonium compounds can be derived from natural oils such as tallow, soy, coconut and palm oil. Useful aliphatic groups in the above formula may be derived from other naturally occurring oils including various vegetable oils, such as corn oil, coconut oil, soybean oil, cottonseed oil, castor oil and the like, as well as various animal oils or fats. The aliphatic groups may likewise be petrochemically derived from, for example, alpha olefins. epresentative examples of useful branched, saturated radicals included 12-methylstearyl and 12-ethylstearyl.

Illustrative examples of suitable alkoxylated quaternary ammonium chloride compounds include those available under the trade name Ethoquad® from Akzo Chemie America, for example, methyl bis(polyoxyethylene [15])cocoalkyl quaternary ammonium chloride, methyl bis(polyoxyethylene [15])oleyl quaternary ammonium chloride, and methyl bis(polyoxyethylene [15])octadecyl quaternary ammonium chloride, wherein the numbers in brackets refer to the total number of ethylene oxide units. Particularly useful is Ethoquad® 18/25.

In one embodiment, the first and third organic cation is octyldecylmethyl [polyoxyethylene (15)] quaternary ammonium chloride.

The second and fourth organic cation is one or more quaternary ammonium compounds readily available in the market place which are not alkoxylated quaternary ammonium salts.

Particularly useful as the second and fourth organic cation is quaternary ammonium compounds having the formula:

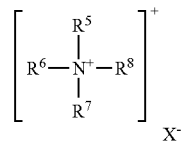

wherein
1. $R^5$ comprises a group selected from linear or branched, saturated or unsaturated aliphatic, aralkyl, or aromatic hydrocarbon groups having from 8 to 30 carbon atoms or alkyl-ester groups having 8 to 30 carbon atoms; more preferred are $C_{12}$ to $C_{22}$ linear saturated alkyl groups, and most preferred are $C_{16}$ to $C_{18}$ linear saturated alkyl groups,
2. $R^6$, $R^7$, and $R^8$ are independently selected from the group consisting of:
a. linear or branched, saturated or unsaturated aliphatic hydrocarbon, fluorocarbon, or other halocarbon groups having from 1 to about 30 carbon atoms;
b. aralkyl or aromatic groups having from 6 to about 30 carbon atoms,
c. amide groups,
d. allyl, vinyl, or other alkenyl or alkynyl groups possessing reactive unsaturation and having from 2 to about 30 carbon atoms,
e. hydrogen and
f. esters; and
$X^-$ comprises an anion selected from the group consisting of chloride, methyl sulfate, acetate, iodide, and bromide; preferably chloride.

The raw materials used to make these quaternary ammonium compounds can be derived from natural oils such as tallow, soya, coconut and palm oil. Useful aliphatic groups in the above formula may be derived from other naturally occurring oils including various vegetable oils, such as corn oil, coconut oil, soybean oil, cottonseed oil, castor oil and the like, as well as various animal oils or fats. The aliphatic groups may likewise be petrochemically derived from, for example, alpha olefins. Representative examples of useful branched, saturated radicals included 12-methylstearyl and 12-ethylstearyl.

Examples of useful aromatic groups include benzyl and benzylic-type materials derived from benzyl halides, benzhydryl halides, trityl halides, halo-phenylalkanes wherein the alkyl chain has from 1 to 30 carbon atoms, such as 1-halo-1-phenyloctadecane; substituted benzyl moieties, such as those derived from ortho-, meta-, and para-chlorobenzyl halides, para-methoxybenzyl halides, ortho-, meta-, and para-nitrilobenzyl halides, and ortho-, meta-, and para-alkylbenzyl halides wherein the alkyl chain contains from 1 to 30 carbon atoms; and fused ring benzyl-type moieties, such as those derived from 2-halomethylnaphthalene, 9-halomethylanthracene, and 9-halomethylphenanthrene, wherein the halo group comprises chloro, bromo, or any other such group which serves as a leaving group in the nucleophilic attack of the benzyl type moiety by a nitrogen atom to generate a substituted amine.

Examples of other aromatic groups include aromatic-type substituents such as phenyl and substituted phenyl; N-alkyl and N,N-dialkyl anilines, where the alkyl groups contain between 1 and 30 carbon atoms; ortho-, meta-, and para-nitrophenyl, ortho-, meta-, and para-alkyl phenyl, wherein the alkyl group contains between 1 and 30 carbon atoms; 2-, 3-, and 4-halophenyl wherein the halo group is defined as chloro, bromo, or iodo; and 2-, 3-, and 4-carboxyphenyl and esters thereof, where the alcohol of the ester is derived from an alkyl alcohol, wherein the alkyl group contains between 1 and 30 carbon atoms, aryl such as phenol, or aralkyl such as benzyl alcohols; and fused ring aryl moieties such as naphthalene, anthracene, and phenanthrene.

Preferred second and fourth organic cations for purposes of the invention include a quaternary ammonium salt that contains at least one, preferably two or three, hydrocarbon chains having from about 8 to about 30 carbon atoms and either methyl or benzyl.

Some examples of particularly preferred second and fourth organic cation quaternary ammonium compounds to make the compositions of this invention are: dimethyl bis[hydrogenated tallow]ammonium chloride (2M2HT), methyl benzyl bis[hydrogenated tallow]ammonium chloride (MB2HT), and methyl tris[hydrogenated tallow alkyl]chloride (M3HT).

In one embodiment, the second and forth organic cation is dimethyl bis[hydrogenated tallow]ammonium chloride (2M2HT).

In one embodiment, the first and third organic cation is octyldecylmethyl [polyoxyethylene (15)] quaternary ammonium chloride and the second and forth organic cation is dimethyl bis[hydrogenated tallow]ammonium chloride (2M2HT).

Compounds useful for the second and fourth organic cation are manufactured by Akzo Nobel, CECA (a French chemical company), Degussa and KAO Chemical Company of Japan.

Also very useful are commercial products that are premixed two organic cation fluids containing both of the two types of quaternaries described above. Particularly useful is Varisoft 5TD made by Goldschmidt, a mixture of alkoxylated and non-alkoxylated quats of the above described types within the range specified; the particular Varisoft 5TD range is approximately 1 part non-alkoxylated quaternary to 2 parts alkoxylated quaternary—this range was found particularly effective.

The preparation of the organic salts can be achieved by techniques well-known in the art. The first quaternary compounds of this invention can typically be prepared by reacting primary or secondary amines with alkylene oxides, such as ethylene and propylene oxide, followed by quaternization. For example, when preparing a quaternary ammonium salt, one skilled in the art may prepare a dialkyl secondary amine, for example, by the hydrogenation of nitriles, see U.S. Pat. No. 2,355,356, and then form the alkoxylated dialkyl tertiary amine by reaction with alkylene oxides such as ethylene and propylene oxides.

Illustrative of the numerous patents which generally describe organic cationic salts, their manner of preparation and their use in the preparation of organophilic clays are commonly assigned U.S. Pat. Nos. 2,966,506; 4,081,496, 4,105,578; 4,116,866; 4,208,218; 4,391,637; 4,410,364; 4,412,018; 4,434,075; 4,434,076; 4,450,095 and 4,517,112; the contents of which are incorporated herein by reference.

The organoclay can be made by a variety of methods, such as by a dilute water slurry, in a pugmill, in a pugmill under pressure, or as a combination of molten quat with clay, as long as the quat fully or almost fully adsorbs onto the clay. The organoclay can be prepared by admixing one or more attapulgite clays, the two quaternary ammonium compound, either individually or as a mixture and water together, preferably at temperatures with the range of from 21° C. to 100° C., more preferably from 35° C. to 79° C., and most preferably from 60° C. to 75° C., for a period of time sufficient for the organic compounds to react with the clay. The attapulgite clay may be dispersed in water prior to addition of the organic cations or simultaneously mixed with water and the organic cations. If the attapulgite clay is first dispersed in water, it may be freed of non-clay impurities by, e.g., centrifugation prior to reaction with the organic cations, and/or sheared to effect exposure of more surface area for reaction with the organic cations. The reaction may be followed by filtering, washing, drying and grinding the organoclay product. Particle size of the organoclay, which plays a role in its effectiveness, can be controlled by grinding, with smaller particle sizes permitting improved dispersion The clay used during manufacture can be dispersed in a water slurry at a concentration of from about 1 to about 80%, and preferably from about 2% to about 7%, the clay/water slurry optionally may be centrifuged to remove non-clay impurities which often constitute from about 1% to about 50% of the starting natural clay composition, the slurry agitated by stirring or other means, heated to a temperature in the range of from 60° C. to 77° C.; the special quaternary ammonium compounds added as described, preferably as a liquid; and the agitation continued to effect and complete the reaction. Blending of the dry clay and the quaternary compound, such as with a pugmill, is also possible, and in some cases may be preferable. Additionally, the clay need not be 100% attapulgite clay. In one embodiment attapulgite clay is a component of a combination or mixture of clays that also includes smectite clays.

The amount of the quaternary ammonium compound added to the clay for purposes of this invention must be sufficient to impart to the clay the enhanced characteristics desired. Such characteristics include the stability at elevated temperatures and the processability. The amount of organic reacted with clay is approximately calculated as a percent of the cationic exchange capacity of the phyllosilicate clay, i.e. the milliequivalent amount of quaternary amine reacted with 100 g clay divided by the cation exchange capacity of the clay sample expressed as milliequivalents per 100 gram pure clay sample times 100 equals the percent organic, here after referred to in this application as "percent organic". The cation exchange capacity (CEC) of the clay can be determined using standard analytical techniques which are known in the art. The total amount of organic cations is provided in an amount relative to the cation exchange capacity of the attapulgite clay. Preferably that amount is +/−25% of the cation exchange capacity, more preferably +/−10%, and most preferably, about equal to the cation exchange capacity.

The alkoxylated organic cation is present in an amount from about 1% to about 100% by weight of the total organic cation content. As a practical processing matter the alkoxylated organic cation will likely be present at about 5 to 95% by weight of the total organic cation content and it is preferred to have at least 50% by weight of the alkoxylated organic cation. The most preferred range is 50% to 75% by weight of the alkoxylated organic cation.

The organophilic clay gellants prepared according to this invention are used as rheological additives in drilling fluid compositions such oil base drilling fluids or invert emulsion drilling fluids. These fluids are prepared by any conventional drilling fluid method including high and low speed dispersers. Consequently, the invention also provides non-aqueous solvent compositions thickened with the above-indicated organophilic clay gellant.

The organophilic clays of this invention are added to the drilling fluid compositions in amounts sufficient to obtain the desired rheological properties. Amounts of the organophilic clay gellant to be added are from about 0.01% to 15%, preferably from about 0.3% to 5%, based on the total weight of the fluid system. The drilling fluid composition can optionally contain additional conventional organoclays with the organophilic clays described herein. For example, in one embodiment the organophilic clays prepared in accordance with the invention are used in a drilling fluid composition in combination with standard organoclays based on bentonite and/or hectorite.

As a first embodiment, this invention provides a mixture of an attapulgite based organoclay and a hectorite based organoclay useful for formulating fluids less temperature dependent rheological properties.

In one embodiment the present invention provides a process for providing less temperature dependent rheological properties to an oil based drilling fluid of the type used in high temperature drilling operations comprising:

a) preparing an oil based, including an invert emulsion, drilling fluid base composition; and b) incorporating into such an oil based drilling fluid base or invert emulsion composition; a mixture of attapulgite and hectorite organoclays made as described above.

The method of this invention may find utility to prepare other non-aqueous fluid systems where improved viscosity stability over a range of temperatures is required.

As discussed above, one embodiment is an oil based or invert emulsion drilling fluid comprising:

a) an oil based drilling fluid base composition; and b) a mixture of attapulgite and hectorite organoclays made as described herein.

Component a) an oil based or invert emulsion drilling fluid base composition, is a drilling fluid composition in which the continuous phase is hydrocarbon-based. Oil based fluids formulated with over 5% water are defined for purpose of this invention as oil based invert emulsion drilling fluids.

The preferred base fluid compositions of this invention are oil based invert emulsions. Such fluids have an oil continuous phase and an aqueous internal phase.

Commonly, oil based invert emulsion drilling fluids will contain water as the discontinuous phase in any proportion up to about 50%. For background the term "emulsion" is commonly used to describe systems in which water is the external or continuous phase and oil is dispersed within the external phase. The term "invert" is meant that the hydrocarbon-oil substance is the continuous or external phase and that an aqueous fluid is the internal phase. Water in the form of brine is often used in forming the internal phase of these type base fluids.

A number of other additives, besides rheological additives regulating viscosity and anti-settling properties, providing other properties can be used in the fluid so as to obtain desired application properties, such as, for example, emulsifiers or emulsifier systems, weighting agents, fluid loss-prevention additives and wetting additives.

The fluids of this invention can be prepared by simple blending the organophilic clay or clays at the proper weight ratio into the drilling fluid or powdered components can be added separately to the fluid.

A process for preparing invert emulsion drilling fluids (oil muds) involves using a mixing device to incorporate the individual components making up that fluid. Primary and secondary emulsifiers and wetting agents (surfactant mix) are added to the base oil (continuous phase) under moderate agitation. The water phase, typically a brine, is added to the base oil/surfactant mix along with alkalinity control agents and acid gas scavengers. Rheological additives as well as fluid loss control materials, weighting agents and corrosion inhibition chemicals are also included, and the agitation continued to ensure dispersion of each ingredient and homogeneity of the resulting fluidized mixture.

As discussed herein, the use of the term oil based or invert emulsion drilling fluid base composition is defined to mean the base oil plus all other ingredients making up the drilling mud except the inventive organoclay rheological agent. The order of addition of the rheological additive is not important and can be strictly random, e.g. the organoclay rheological additive may be pre-blended with other ingredients before incorporation or added by itself. Such products can be added to the base drilling fluid using the wide variety of mixing manufacturing techniques known to the art and to technicians working in the field.

Drilling fluids of this invention display lessened viscosity losses as the drilling fluid is heated above a temperature of 350° F.

The following examples are illustrations designed to assist those skilled in the drilling fluid art to practice the present invention, but are not intended to limit the wide scope of the invention. Various modifications and changes can be made without departing from the essence and spirit of the invention. The various chemicals used in the examples are commercial materials, except for the inventive drilling fluids. API RP 13I and 13B Procedures were followed for the preparation & aging (13I) of the drilling fluids and measuring rheological properties (13B) of the drilling fluids for the following examples:

EXAMPLES 1-5

TABLE 1

| Composition Summary | | | | | |
|---|---|---|---|---|---|
| EA# | 113 | 3190 | 3191 | 3192 | 3193 |
| Attapulgite | Attagel | Attagel | Attagel | Attagel | Attagel |
| Organic content, % of Clay CEC | 100 | 100 | 100 | 100 | 100 |
| Ratio 2M2HT:Ethoquad 18/25 | 100 | 75:25 | 50:50 | 25:75 | 0:100 |

Example 1

Table 1 illustrates the effect of EA-3191 on the viscosity of an oil-based drilling mud after being subjected to 400° F. dynamic conditions. When 5.0 ppb EA-113® (used in combination with 15.0 ppb BENTONE 42®), is compared to 5.0 ppb EA-3191 (used in combination with BENTONE 42®), EA-3191 demonstrated an improved temperature stability by exhibiting a higher rheology after dynamically heat aging at 400° F. The high shear rate viscosity, measured at 600 rpm is 33% greater than that of the EA-113 sample. The low shear rate viscosity, measured at 6 rpm, is also higher in the EA-3191 sample. Additionally, the Yield Point of the EA-113 (12) compared to EA-3191 (22) shows that the EA-3191 will be more effective at suspending solids.

Example 1

| | Additive | |
|---|---|---|
| | EA-113/ BENTONE 42 | EA-3191/ BENTONE 42 |
| | Additive(s) Concentration | |
| | 5 g/15 g HR 400° F. 120° F. Test | 5 g/15 g HR 400° F. 120° F. Test |
| OFI 800 Viscosity @ 120° F. | | |
| 600 RPM Reading | 84 | 112 |
| 300 RPM Reading | 48 | 67 |
| 200 RPM Reading | 34 | 50 |
| 100 RPM Reading | 20 | 30 |
| 6 RPM Reading | 4 | 6 |
| 3 RPM Reading | 4 | 5 |
| Electrical Stability | | |
| Apparent Visc., cPs | 42 | 56 |
| Plastic Visc., cPs | 36 | 45 |
| Yield Point, Lbs/100 ft^2 | 12 | 22 |

| Formulation | Lbs/BBL |
|---|---|
| IAO | 186 g |
| Primary Emulsifier | 10 g |
| 30% CaCl2 Brine | 75 g |
| Lime | 4 g |
| Additive(s) | See Table |
| Barite | 215 g |

Example 2

Table 2 illustrates the effect of high temperature (400° F.) on the viscosity of an oil-based drilling mud contaminated with rev dust to simulate drill solids (rev dust is an altered montmorillonite clay containing 15-40% cristobalite and 10-20% quartz supplied by Milwhite Inc. (CAS#1302-78-9)

When 5.0 ppb EA-113 is combined with 15.0 ppb BENTONE 42®, and compared to 5 ppb of EA-3191 (combined with 15 ppb of BENTONE 42®), EA-3191 exhibited a more stable rheology from before to after heat aging. The EA-113 fluid contaminated with rev dust shows an increased initial rheological profile which dramatically dropped after one 16 hour 400° F. hot roll cycle. For example, the 6 RPM reading declined from 17 to 6 and the 600 RPM reading declined from 110 to 73 after 16 hours at 400° F. In contrast, EA-3191 combined with BENTONE 42® is more tolerant to rev dust contamination (drill solids simulation) as shown in the flatness of the initial and heat aged rheological profile. For example, the 6 RPM reading declined was unchanged and the 600 RPM reading increased from 86 to 95 after 16 hours at 400° F.

Example 2

TABLE 3

| | Additive | | | |
|---|---|---|---|---|
| | EA-113/ BENTONE 42 | | EA-3191/ BENTONE 42 | |
| | Additive(s) Concentration | | | |
| | 5 g/15 g | | 5 g/15 g | |
| | Initial 120° F. Test | HR 400° F. 120° F. Test | Initial 120° F. Test | HR 400° F. 120° F.00 Test |
| OFI 800 Viscosity @ 120° F. | | | | |
| 600 RPM Reading | 110 | 73 | 86 | 95 |
| 300 RPM Reading | 72 | 41 | 51 | 54 |
| 200 RPM Reading | 57 | 30 | 39 | 40 |
| 100 RPM Reading | 41 | 19 | 25 | 26 |
| 6 RPM Reading | 17 | 6 | 8 | 8 |
| 3 RPM Reading | 16 | 5 | 7 | 7 |
| Electrical Stability | | | | |
| Apparent Visc., cPs | 55 | 37 | 43 | 48 |
| Plastic Visc., cPs | 38 | 32 | 35 | 41 |
| Yield Point, Lbs/100 ft^2 | 34 | 9 | 16 | 13 |

| Formulation | Lbs/BBL |
|---|---|
| IAO | 186 g |
| Primary Emulsifier | 10 g |
| 30% CaCl2 Brine | 75 g |
| Lime | 4 g |
| Additive(s) | See Table |
| Barite | 215 g |
| Rev Dust | 25 g |

Example 3

Table 3 illustrates the effect of increasing the Ethoquad® 18/25 (ethoxylated quaternary) concentration in the organic content of the attapulgite organoclay. When a drilling fluid contains attapulgite organoclay with only 2M2HT or Ethoquad® 18/25 as the organic cation, the viscosity is either too low (100% 2M2HT) or too high (100% Ethoquad® 18/25). As the concentration of Ethoquad® 18/25 increases (the concentration of 2M2HT decreases) the rheological profile of an oil-based drilling mud after hot rolling for 16 hours at 400° F. increases.

Example 3

TABLE 3

| | Additive | | | | |
|---|---|---|---|---|---|
| | EA-113/ BENTONE 42 | EA-3190/ BENTONE 42 | EA-3191/ BENTONE 42 | EA-3192/ BENTONE 42 | EA-3193/ BENTONE 42 |
| | Additive(s) Concentration | | | | |
| | 5 g/15 g HR 400° F. 120° F. Test | 5 g/15 g HR 400° F. 120° F. Test | 5 g/15 g HR 400° F. 120° F. Test | 5 g/15 g HR 400° F. 120° F. Test | 5 g/15 g HR 400° F. 120° F. Test |
| OFI 800 Viscosity @ 120° F. | | | | | |
| 600 RPM Reading | 84 | 79 | 112 | 141 | 186 |
| 300 RPM Reading | 48 | 44 | 67 | 85 | 119 |

TABLE 3-continued

| | | | | | |
|---|---|---|---|---|---|
| 200 RPM Reading | 34 | 31 | 50 | 64 | 93 |
| 100 RPM Reading | 20 | 18 | 30 | 40 | 62 |
| 6 RPM Reading | 4 | 3 | 6 | 10 | 23 |
| 3 RPM Reading | 4 | 2 | 5 | 8 | 22 |
| Electrical Stability | | | | | |
| Apparent Visc., cPs | 42 | 40 | 56 | 71 | 93 |
| Plastic Visc., cPs | 36 | 35 | 45 | 56 | 67 |
| Yield Point, Lbs/100 ft$^2$ | 12 | 9 | 22 | 29 | 52 |

| Formulation | Lbs/BBL |
|---|---|
| IAO | 186 g |
| Primary Emulsifier | 10 g |
| 30% CaCl2 Brine | 75 g |
| Lime | 4 g |
| Additive(s) | See Table |
| Barite | 215 g |

Example 4

Table 4 illustrates the effect of an attapulgite organoclay (2925-39-3) and a hectorite organoclay on the rheological and suspension characteristics of a drilling fluid. Each sample was evaluated in a 16 lbs./gal of invert emulsion drilling fluid formula (Formulation-1) with an (85:15) (oil:water) ratio. Sample 2925-39-3, an attapulgite organoclay containing 50% 2M2HT and 50% Ethoquad® 18/25, was evaluated at the load levels of 7, 10 and 16 ppb. Sample B22821, a hectorite organoclay containing 50% 2M2HT and 50% Ethoquad® 18/25 was evaluated at the load levels of 3, 7, 10 and 13 ppb. The drilling fluid compositions were dynamically aged for 16 hours at 150° F. using a roller oven. After the mud compositions were water cooled for one hour, they were mixed on a Hamilton beach MultiMixer for 10 minutes. Viscosity measurements of the mud compositions were measured using the OFI-900 viscometer at 120° F. using test procedures API RP 13B.

The attapulgite organoclay was unable to impart significant rheological properties to the drilling fluid. As the amount of sample 2925-39-3 was increased from 7 to 10 ppb, the 6 RPM reading changed only from 2 to 4 and the 600 RPM reading increased from only from 53 to 62. In contrast the hectorite organoclay provided significant changes in the rheological profile of the drilling fluid. For example, when the amount of sample B22821 was increased from 7 to 10 ppb; the 6 RPM reading increased from 12 to 20 and the 600 RPM reading increased from 81 to 135.

Sag values are representative of the suspension properties which an additive will impart to a drilling fluid composition where a sag value less than 1 is desired. As shown in Table 4, a drilling fluid composition containing increasing amounts of a hectorite organoclay, 7 to 10 ppb, results in a decrease of sag value from 1.49 to 0.61 lbs/gal. However, the improvement in suspension property comes at the expense of undesirable increases in high shear viscosity, as evidence by the 600 RPM viscosity reading, which adversely impacts the rate of penetration into a well while drilling. In contrast, the same increase in weight of an attapulgite organoclay to a drilling fluid resulted in little change to the sag value, i.e., the sag value declined only from 4.86 lbs/gal to 3.36 lbs/gal., and had limited impact on the high shear viscosity.

TABLE 4

| | Additive | | | | |
|---|---|---|---|---|---|
| | 2925-39-3/ 7 ppb | 2925-39-3/ 10 ppb | B22821 7 ppb | B22821 10 ppb | B22821 13 ppb |
| OFI 900 Visc. @ 120° F. | | | | | |
| 600 RPM Reading | 53 | 61 | 81 | 135 | 165 |
| 300 RPM Reading | 27 | 32 | 49 | 85 | 108 |
| 200 RPM Reading | 19 | 23 | 39 | 62 | 88 |
| 100 RPM Reading | 10 | 14 | 27 | 47 | 64 |
| 6 RPM Reading | 2 | 4 | 12 | 20 | 29 |
| 3 RPM Reading | 2 | 3 | 11 | 19 | 27 |
| Apparent Visc., cPs | 27 | 31 | 41 | 68 | 83 |
| Plastic Visc., cPs | 26 | 29 | 32 | 50 | 57 |
| Yield Point, Lbs/100 ft$^2$ | 1 | 3 | 17 | 35 | 51 |
| Electrical Stability | 781 | 546 | 1595 | 1274 | 1417 |
| 10 Sec Gel | 3 | 5 | 14 | 23 | 31 |
| Sag (lbs/gal) | 4.86 | 3.36 | 1.49 | 0.61 | 0.3 |

| Formulation | Lbs/BBL |
|---|---|
| IAO | 157.1 g |
| Emulsifier | 10 g |
| 25% CaCl2 Brine | 39.3 g |
| Lime | 5 g |
| Additive | See Table |
| Barite | 439 g |

Example 5

An ideal drilling fluid is a thixotropic system will exhibit low viscosity when sheared, such as on agitation or circulation (as by pumping or otherwise), but must be able to suspend cuttings when the shearing action is halted. This behavior must be totally reversible. A drilling fluid's viscosity plays a role in the fluid's ability to suspend cuttings. A drilling fluid additive is desirable which imparts good suspension characteristics, sag value less than 1 lbs/gal., without at the same time increasing the high shear viscosity value of the drilling fluid.

Example 5 illustrates the unexpected synergistic effect provided by a mixture of an attapulgite based organoclay and a hectorite based organoclay to obtain a balance of rheological and suspension properties of a drilling fluid. A mixture of 3 ppb of a hectorite organoclay, B22821, mixed with 16 ppb of an attapulgite organoclay, 2925-39-3 ("3/16") was evaluated in a 16 lbs./gal of invert emulsion drilling fluid formula (Formulation-1) with an (85:15) (oil:water) ratio. The drilling fluid compositions were dynamically aged for 16 hours at 150° F. using a roller oven prior to measuring the rheological profile. The 3/16 mixture of organoclays provides good high and low shear viscosities, based on the 600 and 6 RPM readings, and better suspension properties, based on the sag value, to the drilling fluid than the individual organoclays. For example, the drilling fluid containing the 3/16 mixture showed a 600 RPM reading of 113, a 6 RPM reading of 13 and a sag value of 0.86 lbs/gal.

The rheological and suspension properties imparted to the drilling fluid by the 3/16 mixture is not predictable based on the performance of the individual hectorite organoclay or attapulgite organoclay. For example, a drilling fluid containing 3 ppb of hectorite organoclay, B22821, only a 600 RPM reading of 56, a 6 RPM reading of 5 and a sag value of 3.39 lbs/gal. A drilling fluid containing 16 ppb of attapulgite organoclay, 2925-39-3, showed only a 600 RPM reading of 80, a 6 RPM reading of 7 and a Sag value of 2.11 lbs/gal.

The addition of higher amounts of hectorite organoclay to the drilling fluid also does not result in the balance of rheological and suspension properties observed for the 3/16 mixture. In reference to Table 5, a drilling fluid containing 10 ppb of the hectorite organoclay, B22821, showed a sag value of 0.61 lbs/gal which is comparable to the sag value obtained with the 3/16 mixture. However, the improvement in suspension properties comes at the expense of unacceptable high and low shear viscosity values, i.e., a 600 RPM reading of 135 and a 6 RPM reading of 20.

TABLE 6

| | Additive | | |
|---|---|---|---|
| | 2925-39-3/ B22821 16 ppb/ 3 ppb | B22821 3 ppb | 2925-39-3 16 ppb |
| OFI 900 Visc. @ 120° F. | | | |
| 600 RPM Reading | 113 | 56 | 80 |
| 300 RPM Reading | 68 | 31 | 45 |
| 200 RPM Reading | 53 | 23 | 34 |
| 100 RPM Reading | 36 | 15 | 22 |
| 6 RPM Reading | 13 | 5 | 7 |
| 3 RPM Reading | 12 | 5 | 6 |
| Apparent Visc., cPs | 57 | 28 | 40 |
| Plastic Visc., cPs | 45 | 25 | 35 |
| Yield Point, Lbs/100 ft 2 | 23 | 6 | 10 |
| Electrical Stability | 150 | 1517 | 354 |
| 10 Sec Gel | 15 | 7 | 8 |
| Sag (lbs/gal) | 0.86 | 3.39 | 2.11 |

| Formulation | Lbs/BBL |
|---|---|
| IAO | 157.1 g |
| Emulsifier | 10 g |
| 25% Cacl2 Brine | 39.3 g |
| Lime | 5 g |
| Additive | See Table |
| Barite | 439 g |

What is claimed:

1. A composition comprising a mixture of a hectorite organoclay composition and an attapulgite organoclay composition,
    said hectorite organoclay composition comprising (i) a hectorite clay having a cation exchange capacity of at least 75 milliequivalents per 100 grams of clay, 100% active clay basis; and (ii) dimethyl bis[hydrogenated tallow] ammonium cation, and (iii) octyldecylmethyl methyl [polyoxylene (15)] ammonium cation, wherein said dimethyl bis[hydrogenated tallow] ammonium cation and octyldecylmethyl methyl [polyoxylene (15)] ammonium cation are in a weight percentage ratio of 1:1 and the total amount of dimethyl bis[hydrogenated tallow] ammonium cation and octyldecylmethyl methyl [polyoxylene (15)] ammonium cation is about equal to the cation exchange capacity of the hectorite clay; and
    said attapulgite organoclay composition comprising (i) an attapulgite clay having a cation exchange capacity of at least 5 milliequivalents per 100 grams of clay, 100% active clay basis; and (ii) dimethyl bis[hydrogenated tallow] ammonium cation, and (iii) octyldecylmethyl methyl [polyoxylene (15)] ammonium cation, wherein said dimethyl bis[hydrogenated tallow] ammonium cation and octyldecylmethyl methyl [polyoxylene (15)] ammonium cation are in a weight percentage ratio of 1:1 and wherein the total amount of dimethyl bis[hydrogenated tallow] ammonium cation and octyldecylmethyl methyl [polyoxylene (15)] ammonium cation is provided in an amount from about +25% to −25% of the cation exchange capacity of the attapulgite clay, wherein
    said hectorite organoclay composition is present in an amount ranging from 14% by weight to 30% by weight of the total mixture and said attapulgite organoclay composition is present in an amount ranging from 70% by weight to 91% by weight.

2. An oil based drilling fluid additive comprising:
    a) an oil based drilling fluid base composition;
    b) a mixture of a hectorite organoclay composition and an attapulgite organoclay composition according to claim 1.

3. A method for providing an oil based drilling fluid comprising the steps of:
    a) preparing an oil based drilling fluid composition; and
    b) incorporating into such oil based drilling fluid composition the mixture according to claim 1.

4. The method of claim 3, wherein said oil based drilling fluid composition is an oil based invert emulsion drilling fluid composition.

5. An oil based drilling fluid comprising:
    a synergistic of a mixture oil based drilling fluid base composition;
    a hectorite organoclay composition and an attapulgite organoclay composition, wherein said hectorite organoclay composition is present in an amount ranging from 14% by weight to 30% by weight of the total mixture of hectorite organoclay and attapulgite organoclay, and said attapulgite organoclay composition is present in an amount ranging from 70% by weight to 91% by weight of the mixture of hectorite organoclay and attapulgite organoclay, said hectorite organoclay composition comprising (i) a hectorite clay having a cation exchange capacity of at least 75 milliequivalents per 100 grams of clay, 100% active clay basis; and (ii) dimethyl bis[hydrogenated tallow] ammonium cation, and (iii) octyldecylmethyl methyl [polyoxylene (15)] ammonium cation, wherein said dimethyl bis[hydrogenated tallow] ammonium cation and octyldecylmethyl methyl [polyoxylene (15)] ammonium cation are in a weight percentage ratio of 1:1; and the total amount of dimethyl bis[hydrogenated tallow] ammonium cation and octyldecylmethyl methyl [polyoxylene (15)] ammonium cation is about equal to the cation exchange capacity of the hectorite clay; and said attapulgite organoclay composition comprising (i) an attapulgite clay having a cation exchange capacity of at least 5 milliequivalents per 100 grams of clay, 100% active clay basis; and (ii) dimethyl bis[hydrogenated tallow] ammonium cation, and (iii) octyldecylmethyl methyl [polyoxylene (15)] ammonium cation, wherein said dimethyl bis[hydrogenated tallow] ammonium cation and octyldecylmethyl methyl [polyoxylene (15)] ammonium cation are in a weight percentage ratio of 1:1; and wherein the total amount of dimethyl bis[hydrogenated tallow] ammonium cation and octyldecylmethyl methyl [polyoxylene (15)] ammonium cation is provided in an amount from about +25% to −25% of the cation exchange capacity of the attapulgite clay.

6. A method to provide a balance of rheological and sag properties of a drilling fluid composition comprising:

providing a drilling fluid composition comprising an oil based drilling fluid base composition, and an amount of drilling fluid additive comprising an hectorite organoclay composition and an attapulgite organoclay composition, wherein said hectorite organoclay composition is present in an amount ranging from 14% by weight to 30% by weight of the total mixture of hectorite organoclay and attapulgite organoclay, and said attapulgite organoclay composition is present in an amount ranging from 70% by weight to 91% by weight of the mixture of hectorite organoclay and attapulgite organoclay, said hectorite organoclay composition comprising (i) a hectorite clay having a cation exchange capacity of at least 75 milliequivalents per 100 grams of clay, 100% active clay basis; and (ii) dimethyl bis[hydrogenated tallow] ammonium cation, and (iii) octyldecylmethyl methyl [polyoxylene (15)] ammonium cation, wherein said dimethyl bis[hydrogenated tallow] ammonium cation and octyldecylmethyl methyl [polyoxylene (15)] ammonium cation are in a weight percentage ratio of 1:1; and the total amount of dimethyl bis[hydrogenated tallow] ammonium cation and octyldecylmethyl methyl [polyoxylene (15)] ammonium cation is about equal to the cation exchange capacity of the hectorite clay; and said attapulgite organoclay composition comprising (i) an attapulgite clay having a cation exchange capacity of at least 5 milliequivalents per 100 grams of clay, 100% active clay basis; and (ii) dimethyl bis[hydrogenated tallow] ammonium cation, and (iii) octyldecylmethyl methyl [polyoxylene (15)] ammonium cation, wherein said dimethyl bis[hydrogenated tallow] ammonium cation and octyldecylmethyl methyl [polyoxylene (15)] ammonium cation are in a weight percentage ratio of 1:1; and wherein the total amount of dimethyl bis[hydrogenated tallow] ammonium cation and octyldecylmethyl methyl [polyoxylene (15)] ammonium cation is provided in an amount from about +25% to −25% of the cation exchange capacity of the attapulgite clay, wherein the drilling fluid composition exhibits a higher 600 RPM reading and lower sag value compared to a drilling fluid composition containing an amount of hectorite organoclay composition equal to the amount of drilling fluid additive, said hectorite composition comprising (i) a hectorite clay having a cation exchange capacity of at least 75 milliequivalents per 100 grams of clay, 100% active clay basis; and (ii) dimethyl bis[hydrogenated tallow] ammonium cation, and (iii) octyldecylmethyl methyl [polyoxylene (15)] ammonium cation, wherein said dimethyl bis[hydrogenated tallow] ammonium cation and octyldecylmethyl methyl [polyoxylene (15)] ammonium cation are in a weight percentage ratio of 1:1 and the total amount of dimethyl bis[hydrogenated tallow] ammonium cation and octyldecylmethyl methyl [polyoxylene (15)] ammonium cation is about equal to the cation exchange capacity of the hectorite clay; or compared to a drilling fluid composition containing an amount of attapulgite organoclay composition equal to the amount of drilling fluid additive, said attapulgite organoclay composition comprising (i) an attapulgite clay having a cation exchange capacity of at least 5 milliequivalents per 100 grams of clay, 100% active clay basis; and (ii) dimethyl bis[hydrogenated tallow] ammonium cation, and (iii) octyldecylmethyl methyl [polyoxylene (15)] ammonium cation, wherein said dimethyl bis[hydrogenated tallow] ammonium cation and octyldecylmethyl methyl [polyoxylene (15)] ammonium cation are in a weight percentage ratio of 1:1 and wherein the total amount of dimethyl bis[hydrogenated tallow] ammonium cation and octyldecylmethyl methyl [polyoxylene (15)] ammonium cation is provided in an amount from about +25% to −25% of the cation exchange capacity of the attapulgite clay.

* * * * *